US012687201B2

(12) United States Patent
Herrera Caballero et al.

(10) Patent No.: US 12,687,201 B2
(45) Date of Patent: Jul. 21, 2026

(54) PORTABLE INDUCTION HEATER FOR ANNULAR BEARING COMPONENTS COMPRISING POCKETS

(71) Applicant: Aktiebolaget SKF, Gothenburg (SE)

(72) Inventors: Alberto Javier Herrera Caballero, Utrecht (NL); Sebastien David, Ouderkerk a/d Amstel (NL)

(73) Assignee: Aktiebolaget SKF, Gothenburg (SE)

( * ) Notice: Subject to any disclaimer, the term of this patent is extended or adjusted under 35 U.S.C. 154(b) by 752 days.

(21) Appl. No.: 17/985,858

(22) Filed: Nov. 13, 2022

(65) Prior Publication Data

US 2023/0184293 A1     Jun. 15, 2023

(30) Foreign Application Priority Data

Dec. 13, 2021     (DE) .......................... 102021214231.1

(51) Int. Cl.
*F16C 35/063*          (2006.01)
(52) U.S. Cl.
CPC .................................. *F16C 35/063* (2013.01)
(58) Field of Classification Search
CPC ........ F16C 35/02; F16C 35/06; F16C 35/063; F16C 2226/14; F16C 2237/00; H05B 6/00; H05B 6/02; H05B 6/10; H05B 6/101; H05B 6/14; H05B 6/145
See application file for complete search history.

(56) References Cited

U.S. PATENT DOCUMENTS

| | | | |
|---|---|---|---|
| 5,248,865 A | 9/1993 | Tyler | |
| 5,374,809 A | 12/1994 | Fox et al. | |
| 2011/0169447 A1 | 7/2011 | Brown et al. | |
| 2017/0257913 A1* | 9/2017 | Vengroff | .............. H05B 6/1263 |

FOREIGN PATENT DOCUMENTS

| | | | |
|---|---|---|---|
| JP | H0676928 A | 3/1994 | |
| WO | WO-0130117 A1* | 4/2001 | ............... H05B 6/14 |

OTHER PUBLICATIONS

"Clamping and cutting technology," Bessey Catalog, Jul. 1, 2016-17.

* cited by examiner

*Primary Examiner* — Hung D Nguyen
(74) *Attorney, Agent, or Firm* — Stinson LLP

(57)          ABSTRACT

A portable heater for an annular bearing component includes an induction heater having a heating clamp connector and a main cable for the alimentation of the induction heater, a housing inside which is located the induction heater, the housing providing openings for the heating clamp connector and the main cable, a handle in order for an operator to grab the portable heater, and at least one pocket, a heating clamp intended to be stored into the pocket and intended to be connected to the heating clamp connector when in use.

8 Claims, 2 Drawing Sheets

PORTABLE INDUCTION HEATER FOR ANNULAR BEARING COMPONENTS COMPRISING POCKETS

CROSS-REFERENCE TO RELATED APPLICATIONS

This application claims priority to German Patent Application no. 102021214231.1, filed Dec. 13, 2021, the contents of which is fully incorporated herein by reference.

TECHNICAL FILED OF THE INVENTION

The present invention generally relates to the heating of annular bearing components. An annular bearing component relates to a bearing provided with rolling elements, typically balls or rollers, arranged between an inner bearing ring and an outer bearing ring. An annular bearing component can also relate to a plain bearing without rolling elements. An annular bearing component can further relate to a single ring, for example an inner bearing ring or an outer bearing ring. In particular, the invention concerns heating annular bearing components with an induction heater.

BACKGROUND OF THE INVENTION

Thermal expansion of such annular bearing components induced by induction heating is used, for example, to facilitate the mounting of the bearing on a shaft and/or to obtain an interference fit on the shaft as the bearing cools.

A bearing induction heater heats the annular bearing component until a desired measured temperature of the annular bearing component is reached or until a predefine heating time is reached.

The desired heating time or the desired heating temperature for a particular annular bearing component is generally determined empirically and presented to the user of the induction heater in the form of a reference table.

In an embodiment, an induction heater is a device working with a heating clamp comprising a winding in order to circle an annular bearing component and to heat the annular bearing element.

At the same time, an operator can measure the temperature of the annular bearing component with a temperature probe.

However, the heating clamp, the temperature probe and the heat resistant gloves of the operator must be carried separately from the induction heater, for example stored in a bag. In order to use the induction heater, the operator must open his bag, bring out the temperature probe, the heating clamp, the gloves and connect one by one the probe and the clamp to the induction heater.

This procedure is thus long and makes the induction heater not easy to carry and to use.

Consequently, the present invention intends to overcome these disadvantages by providing means to quickly and simply store and use an induction heater and his peripherals, like a heating clamp, a temperature probe and gloves.

SUMMARY OF THE INVENTION

One object of the invention is to provide a portable heater for annular bearing component comprising:

an induction heater comprising a heating clamp connector and a main cable for the alimentation of the induction heater, a housing inside which is located the induction heater, the housing being provided with openings for the heating clamp connector and the main cable, with a handle to grab the portable heater, and with at least one pocket, and a heating clamp intended to be stored into the pocket and intended to be connected to the heating clamp connector in use.

In one embodiment, the induction heater comprises a temperature probe connector and the housing comprises a temperature probe connector opening.

Advantageously, the housing further comprises a temperature probe pocket inside which is stored a temperature probe.

According to an embodiment, the housing further comprises a gloves pocket inside which are stored gloves.

Advantageously, the portable heater comprises a bearing holder intended to hold the annular bearing component during the heating of the annular bearing component with the portable heater, and the housing comprises a bearing holder pocket inside which is stored the bearing holder.

According to an embodiment, the housing comprises a wrapping portion onto which the main cable can be wrapped, the wrapping portion being located on the opposite side to the handle.

Advantageously, the bearing holder pocket is placed in the wrapping portion.

In an embodiment, the induction heater comprises a power button and the housing comprises a power button opening.

Advantageously, the induction heater further comprises a user interface area and the housing is provided with one opening for the user interface area.

Advantageously, the user interface area comprises a display and/or buttons to control the duration and/or the temperature of the heating of an annular bearing component.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Other advantages and features of the invention will appear from the detailed description of embodiments of the invention, which are non-limiting examples, illustrated on the appended drawings of which.

DETAILED DESCRIPTION OF THE INVENTION

Figure 1:
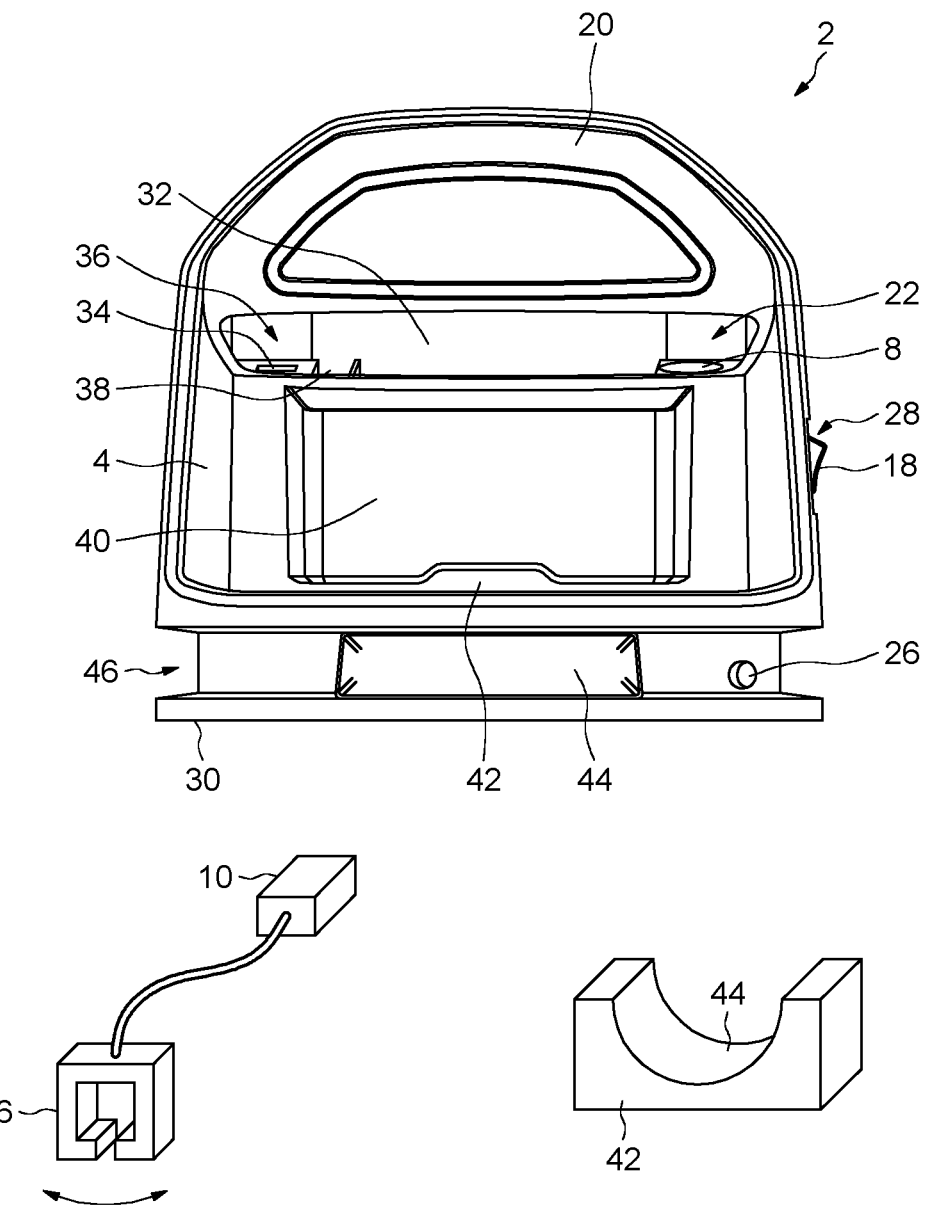
FIG. 1 is a schematic front view of an embodiment of a portable heater according to the invention and of a bearing holder and a heating clamp.
Figure 2:
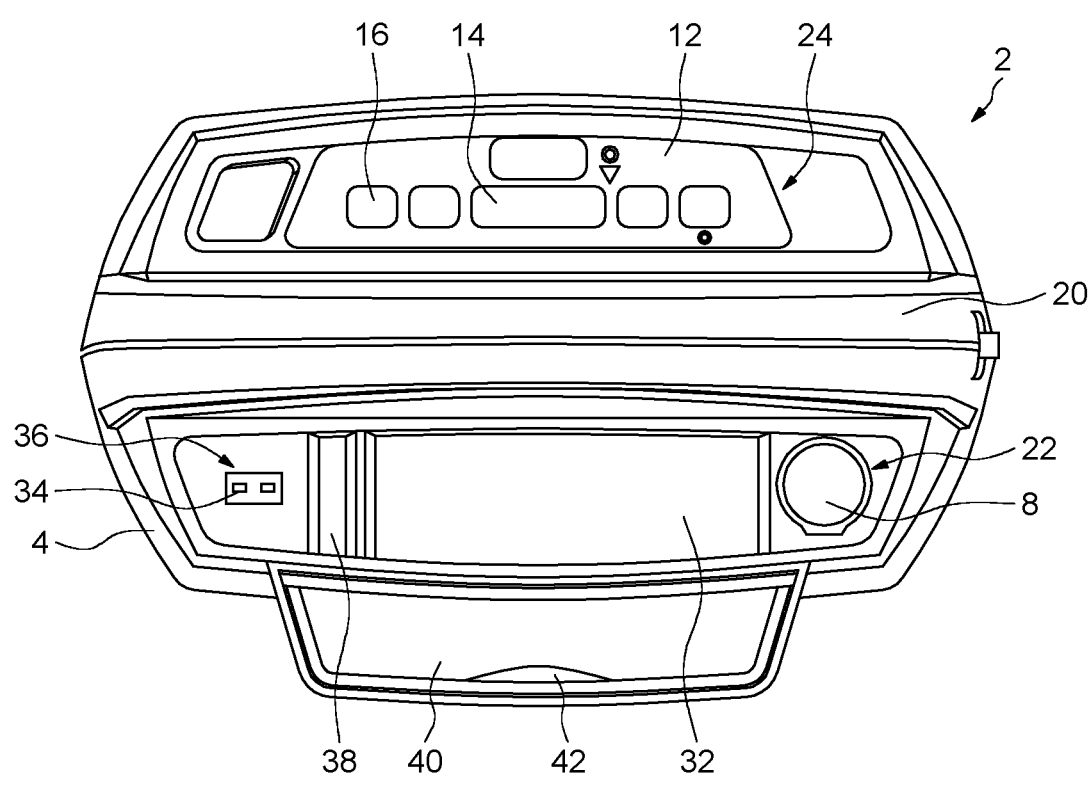
FIG. 2 is a top view of the embodiment illustrated in FIG. 1.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. As shown in FIGS. 1 and 2, a portable heater 2 for annular bearing component comprises an induction heater (not represented), a housing 4 inside which is located the induction heater, and a heating clamp 6.

The heating clamp 6 comprises a winding or a metallic loop in ferrite or electrical steel destined to circle an annular bearing component and to heat the annular bearing element by induction.

The induction heater comprises a current generator (not represented) in order to generate a current that passes in the heating clamp 6 when the heating clamp 6 is connected to the induction heater. Consequently, the induction heater further comprises a heating clamp connector 8 in order to connect the heating clamp 6 to the induction heater with a corresponding plug 10 of the heating clamp 6.

The induction heater also comprises a user interface area 12 and a main cable (not represented) for the alimentation of the induction heater.

For example, the user interface area 12 comprises a display 14 and/or buttons 16 to control the duration and/or the temperature of the heating of an annular bearing component. The user interface area 12 may include the possibility to set an automatic stop to the heating when the temperature and/or the duration of the heating has reached a predefined value.

In addition to the user interface area 12, the induction heater comprises an optional power button 18. It allows an operator to turn on or off the induction heater other than unplugging the main cable.

The housing 4 protects the induction heater and allows to an operator to easily carry and transport the induction heater. For this matter, the housing comprises a handle 20 in order for an operator to grab the portable heater 2.

The housing 4 also comprises a heating clamp connector opening 22, a user interface area opening 24 and a main cable opening 26. Those openings 22, 24 are made in the material of the housing 4 in order to access the heating clamp connector 8 and the user interface area 12 from the outside. The opening 26 allows the main cable to pass through the housing 4.

In an embodiment where the induction heater comprises a power button 18, the housing 4 also comprises a power button opening 28 in order to access to the power button 18. Optionally, each opening can be temporarily closed by an adapted cap.

For example, the material of the housing 4 comprises plastic and the housing 4 is molded.

In the embodiment illustrated, the housing 4 comprises a base 30 intended to maintain the portable heater 2 in a standard position when the base 30 of the portable heater 2 is placed on a flat surface, for example a table or the ground. In this standard position, the handle 20 extends on the top of the portable heater 2, and the user interface area 12 and the heating clamp connector 8 are also placed on the top of the portable heater 2. It is then easier for an operator to access to the heating clamp connector 8 and to the user interface area 12 when the portable heater 2 is placed on the ground.

The housing 4 also comprises at least one pocket 32 made in its material to store the heating clamp 6 when not in use. In the embodiment illustrated in FIGS. 1 and 2, several other pockets are integrated in the housing 4 in order to carry and store easily other accessories of the portable heater 2.

For example, the induction heater can display the temperature of a heated annular bearing component. Thus, the induction heater comprises a temperature probe connector 34 in order to connect a temperature probe as an accessory to the induction heater. Accordingly, the housing 4 comprises a temperature probe connector opening 36 in the material of the housing 4. Optionally, the temperature probe connector opening 36 can be temporarily closed by an adapted cap.

The housing 4 further comprises a temperature probe pocket 38 inside which can be stored a temperature probe when not in use.

Advantageously, the temperature probe connector 34 and the temperature probe pocket 36 are placed just nearby each other in order not to disconnect the temperature probe when not in use. Likewise, the heating clamp connector 8 and the heating clamp pocket 32 are placed just nearby each other in order not to disconnect the heating clamp 6 when not in use. This makes the portable heater 2 easy and ready to use without having to extract the accessories from another bag. It allows the operator to spend less time searching and connecting the accessories.

The temperature probe pocket 38 and the heating clamp pocket 32 can also be used to store other accessories.

In addition, the housing 4 also comprises a gloves pocket 40 inside which heat resistant gloves can be stored when not used by the operator. The gloves pocket 40 is the most distal pocket because no connector needs to be nearby. The gloves pocket can be placed next to the heating clamp pocket 32. In addition, the gloves pocket comprises a hole 42 to evacuate liquids.

The openings of the temperature probe pocket 38, the heating clamp pocket 32, and the gloves pocket 40 are placed at the top of the portable heater 2 when the portable heater 2 is in standard position. It is then easier for an operator to access to the accessories that are the gloves, the temperature probe and the heating clamp 6.

In the embodiment illustrates in FIGS. 1 and 2, the user interface area 12 is placed on one side of the handle 20 and the pockets 32, 38 and 40 and connectors 8 and 34 are placed on the other side of the handle 20.

The portable heater 2 can also comprise a bearing holder 42. The geometry of the bearing holder 42 comprises a concave surface 44 to receive an annular bearing component. The bearing holder 42 is intended to hold still the annular bearing component during the heating of the annular bearing component with the portable heater 2. The housing 4 comprises a bearing holder pocket 44 inside which can be stored the bearing holder 42.

In one embodiment, the housing 4 also comprises a wrapping portion 46 onto which the main cable can be wrapped. For example, the wrapping portion 46 is located on the opposite side to the handle 20, next to the base 30.

The wrapping portion 46 comprises reduced sectional dimensions compared to the section of the base 30 and to the section of the rest of the housing 4. This reduction of the dimensions allows the main cable to be wrapped around the wrapping portion 46 when not in use and without exceeding the global geometry of the portable heater 2.

Advantageously, the main cable opening 26 is made in the wrapping portion 46 so that the main cable can directly be wrapped around the wrapping portion.

In one embodiment, the bearing holder pocket 44 is placed in the wrapping portion 46 in order to save space. The opening of the bearing holder pocket 44 is directed to the side of the portable heater 2 when the portable heater 2 is in standard position.

The invention claimed is:

1. A portable heater for annular bearing component comprising:

an induction heater comprising a heating clamp connector and a main cable for the alimentation of the induction heater, a housing inside which is located the induction heater, the housing being provided with openings for the heating clamp connector and the main cable, with a handle to grab the portable heater, and with at least one pocket, the housing having a base configured for placement on a supporting surface during operation of the portable heater;

a heating clamp intended to be stored into the pocket and intended to be connected to the heating clamp connector in use;

a bearing holder intended to hold the annular bearing component during the heating of the annular bearing component with the portable heater;

the housing defines a bearing holder pocket configured to store the bearing holder when the bearing holder is not in use, the bearing holder pocket being located adjacent to the base and has a pocket which has a bearing holder pocket opening on a lateral side of an outside of the housing;

the housing defines a gloves pocket configured to store gloves therein, the gloves pocket has a gloves pocket opening on the lateral side of the outside of the housing on a side of the bearing pocket holder opposite from the base, the housing further defining a hole between the gloves pocket an an outside of the housing configured to allow fluid to drain from the gloves pocket to outside of the housing.

2. The portable heater according to claim 1, wherein the induction heater comprises a temperature probe connector and the housing comprises a temperature probe connector opening.

3. The portable heater according to claim 2, wherein the housing further comprises a temperature probe pocket inside which is stored a temperature probe.

4. The portable heater according to claim 1, wherein the housing comprises a wrapping portion onto which the main cable can be wrapped, the wrapping portion being located on the opposite side to the handle.

5. The portable heater according to claim 1, wherein the housing defines a channel therearound which is adjacent to the base, the channel having a channel base, the bearing holder pocket being located in the channel base, the channel being configured to provide a wrapping portion configured to receive a cord thereover.

6. The portable heater according to claim 1, wherein the induction heater comprises a power button and the housing comprises a power button opening.

7. The portable heater according to claim 1, wherein the induction heater further comprises a user interface area and the housing is provided with one opening for the user interface area.

8. The portable heater according to claim 7, wherein the user interface area comprises a display and/or buttons to control the duration and/or the temperature of the heating of an annular bearing component.

\* \* \* \* \*